United States Patent
Kim et al.

(10) Patent No.: US 8,810,059 B2
(45) Date of Patent: Aug. 19, 2014

(54) EFFECTIVE LOW VOLTAGE TO MEDIUM VOLTAGE TRANSMISSION ON PRIME BAND

(75) Inventors: Il Han Kim, Dallas, TX (US); Badri N. Varadarajan, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 709 days.

(21) Appl. No.: 13/087,116

(22) Filed: Apr. 14, 2011

(65) Prior Publication Data
US 2011/0267177 A1   Nov. 3, 2011

Related U.S. Application Data

(60) Provisional application No. 61/329,357, filed on Apr. 29, 2010.

(51) Int. Cl.
*H04B 3/56* (2006.01)
*H02J 3/00* (2006.01)

(52) U.S. Cl.
CPC ... *H04B 3/56* (2013.01); *H02J 3/00* (2013.01); *H04B 2203/5483* (2013.01)
USPC ....................................... 307/1; 307/3; 307/4

(58) Field of Classification Search
CPC .... H04B 3/54; H04B 3/56; H04B 2203/5483; H02J 3/00
USPC ....................................... 307/1, 3, 4
See application file for complete search history.

(56) References Cited

U.S. PATENT DOCUMENTS

| | | |
|---|---|---|
| 2009/0315700 A1 | 12/2009 | Horowitz et al. |
| 2010/0049830 A1 | 2/2010 | Chenu et al. |

FOREIGN PATENT DOCUMENTS

| | | | |
|---|---|---|---|
| KR | 1020030081648 A | 10/2003 |

*Primary Examiner* — Hal Kaplan
(74) *Attorney, Agent, or Firm* — Steven A. Shaw; Frederick J. Telecky, Jr.

(57) ABSTRACT

Coupling and interface circuits for powerline modems are disclosed. A powerline modem may be coupled to a low voltage (LV) line or a medium voltage (MV) line using a circuit that is designed to compensate for signal attenuation and loss that is created by the a LV/MV transformer and/or a MV coupler. In one embodiment, separate coupling transformers may be used by the modem for reception and transmission. In other embodiments, a capacitance is switched on the transmission line before the modem transmits to lower the line impedance.

9 Claims, 7 Drawing Sheets

EFFECTIVE LOW VOLTAGE TO MEDIUM VOLTAGE TRANSMISSION ON PRIME BAND

CROSS-REFERENCE TO RELATED APPLICATIONS

This application claims the benefit of the filing dates of U.S. Provisional Application No. 61/329,357, which is titled "Effective Low Voltage to Medium Voltage Transmission on PRIME Band" and was filed Apr. 29, 2010, the disclosure of which is hereby incorporated by reference herein in its entirety.

TECHNICAL FIELD

Embodiments are directed, in general, to powerline communications (PLC) and, more specifically, to methods of low voltage to medium voltage transmission.

BACKGROUND

Powerline communications (PLC) is a useful medium for advanced metering infrastructure (AMI). PLC allows communication signals to be sent through an already installed line, so new communication lines do not need to be added. In Europe and China, many houses are connected under one low voltage (LV)/medium voltage (MV) distribution transformer. In those countries, AMI is being implemented through low voltage lines. This means that a single base node can reside in the LV side and may serve many houses. In this case, the communication signals from the base node do not need to pass through the LV/MV distribution transformer to reach the service nodes.

However, in the United States, only a few houses are connected on the low voltage side of the LV/MV distribution transformer. As a result, if the base nodes were to be positioned on the low voltage side in the United States system, then many base nodes would be needed to cover large areas or large numbers of houses. To be cost effective and to serve as many houses as possible with a fewer base nodes, in the United States power grid, the base nodes should reside on the medium voltage side of the LV/MV distribution transformers. This means that the communication signals would have to pass through the LV/MV distribution transformers. LV/MV distribution transformers typically act as a low pass filter because they are designed to pass 50/60 Hz power signals.

SUMMARY OF THE INVENTION

In one embodiment, a modem interface for communication on a powerline communication network comprises separate transmitter and receiver transformers. The transmission transformer is adapted to couple signals from a modem to a medium voltage line on the powerline communication network through a medium voltage coupler. The transmission transformer has a first turns ratio. The receiver transformer is adapted to couple signals received from the medium voltage line to the modem through a medium voltage coupler. The receiver transformer has a second turns ratio that is greater than the first turns ratio. The first turns ratio for the transmission transformer may be selected to amplify the signals transmitted from the modem, and the second turns ratio for the receive transformer may be selected to amplify the signals received from the powerline communication network. In one configuration, the first turns ratio for the transmission transformer is 1:1.5, and the second turns ratio for the receive transformer is 1.5:1.

In another embodiment, an interface for communication on a powerline communication network comprises a transformer circuit that couples a modem to a powerline. A first coupling capacitor couples the transformer circuit to the powerline. A second coupling capacitor may be coupled in parallel to the first coupling capacitor via a switch. The switch is placed in an open position during reception by the modem. The switch is then placed in a closed position during transmission by the modem. The value of the second capacitor is selected to increase a reactive power of the interface when the switch is closed. The powerline may be a low-voltage or a medium-voltage powerline.

In a further embodiment, an interface for a powerline communication network comprises a line driver circuit that provides data signals to be transmitted to the powerline communication network. A passive filter is coupled to an output of the line driver circuit, and a transformer is coupled to an output of the passive filter. A high pass filter is coupled between an output of the transformer and a medium voltage powerline. The high pass filter and passive filter attenuate signals at a power carrier frequency on the medium voltage powerline before those signals can reach the line driver circuit. The power carrier frequency may be 50 Hertz or 60 Hertz. The transformer has a turns ratio that amplifies transmitted data signals from the line driver circuit, and that attenuates received signals from the medium voltage powerline at a power carrier frequency.

BRIEF DESCRIPTION OF THE DRAWINGS

Figure 1:
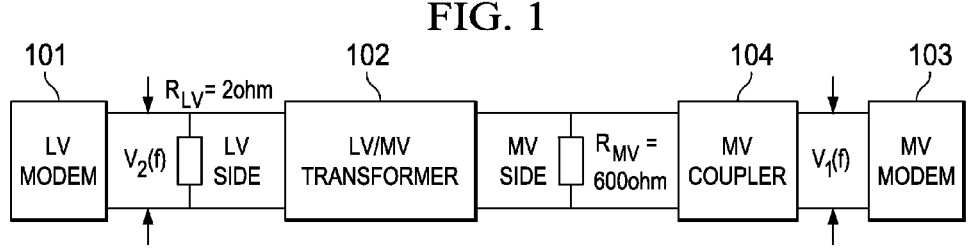
Figure 2:
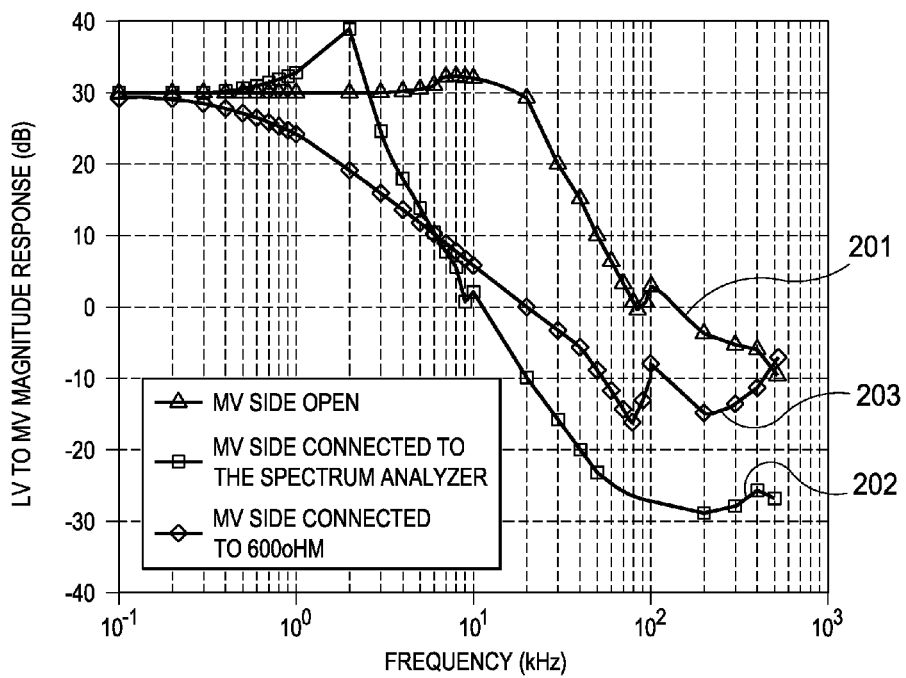
Figure 3:
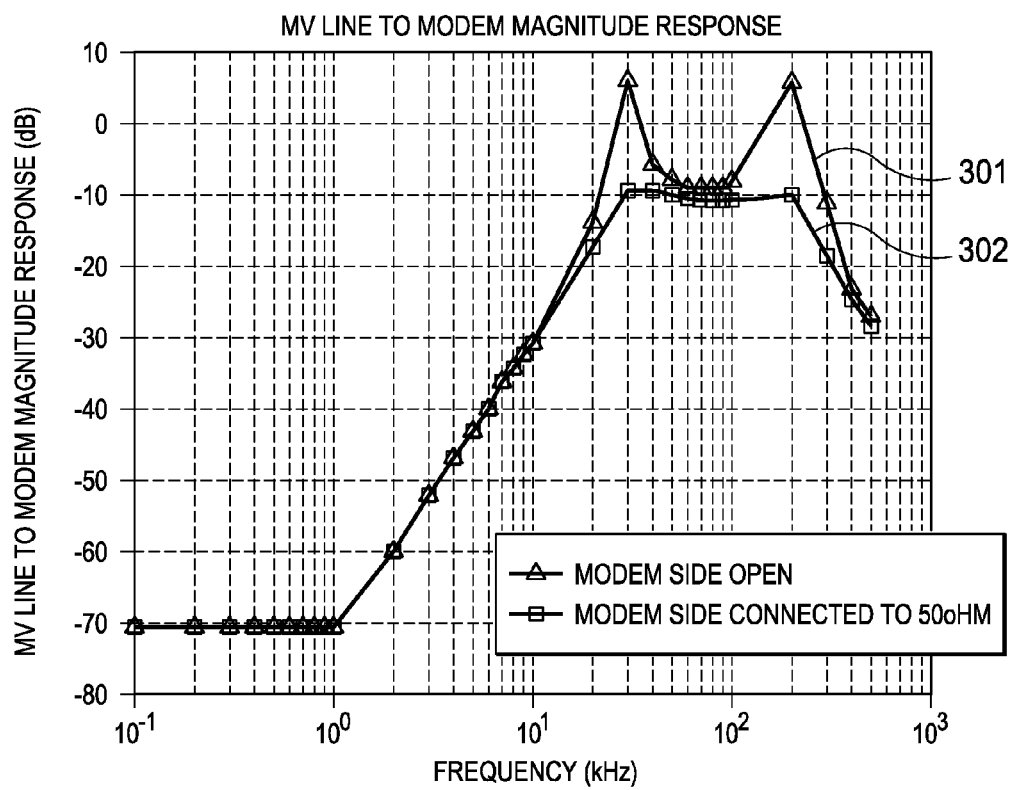
Figure 4:
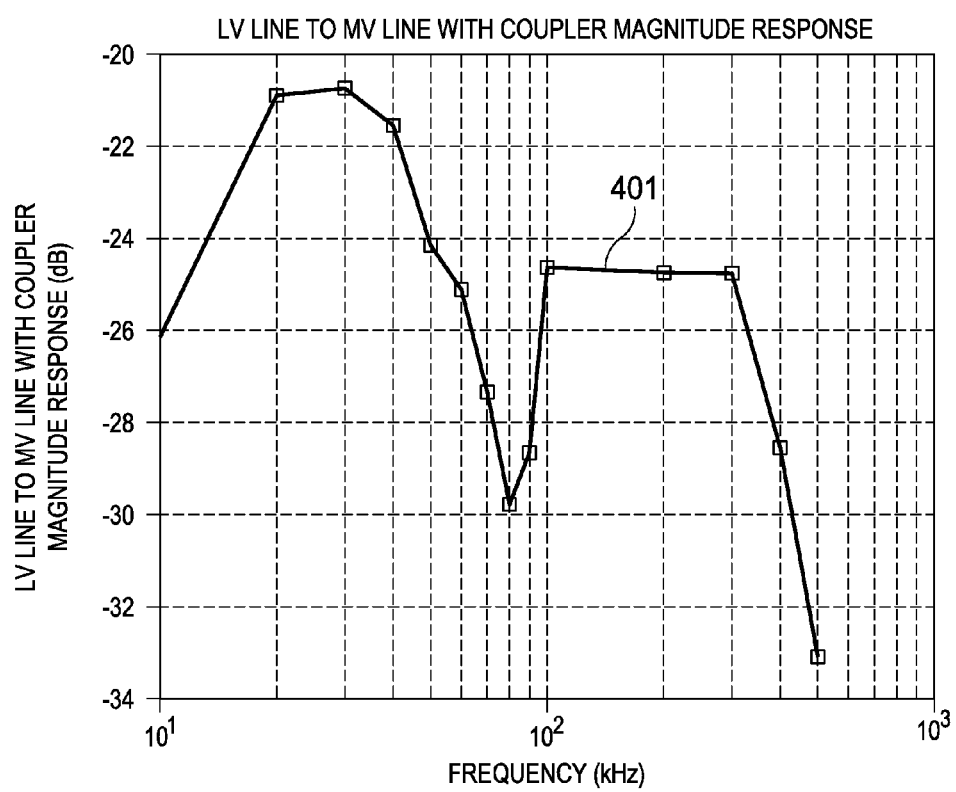
Figure 5:
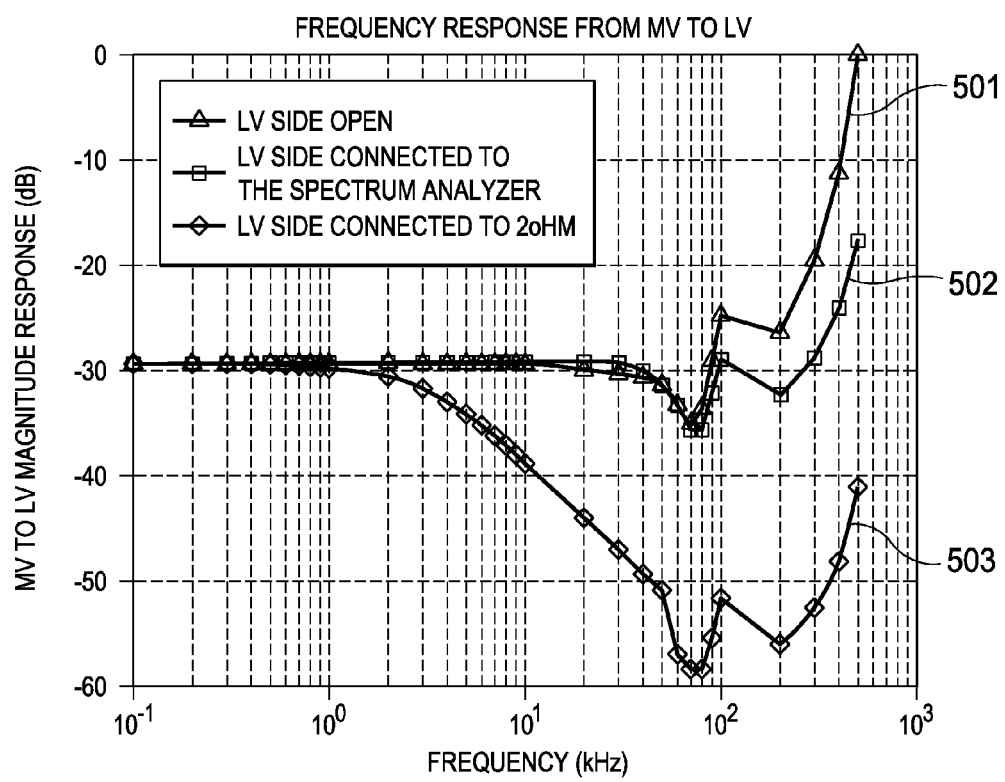
Figure 6:
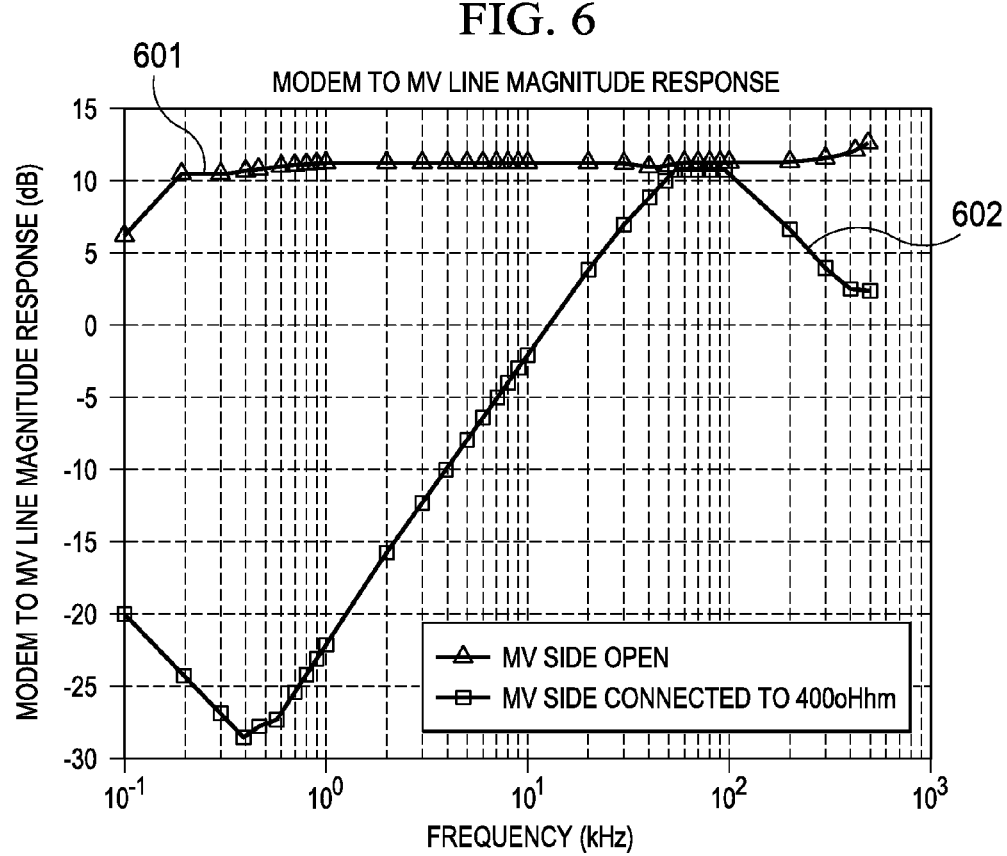
Figure 7:
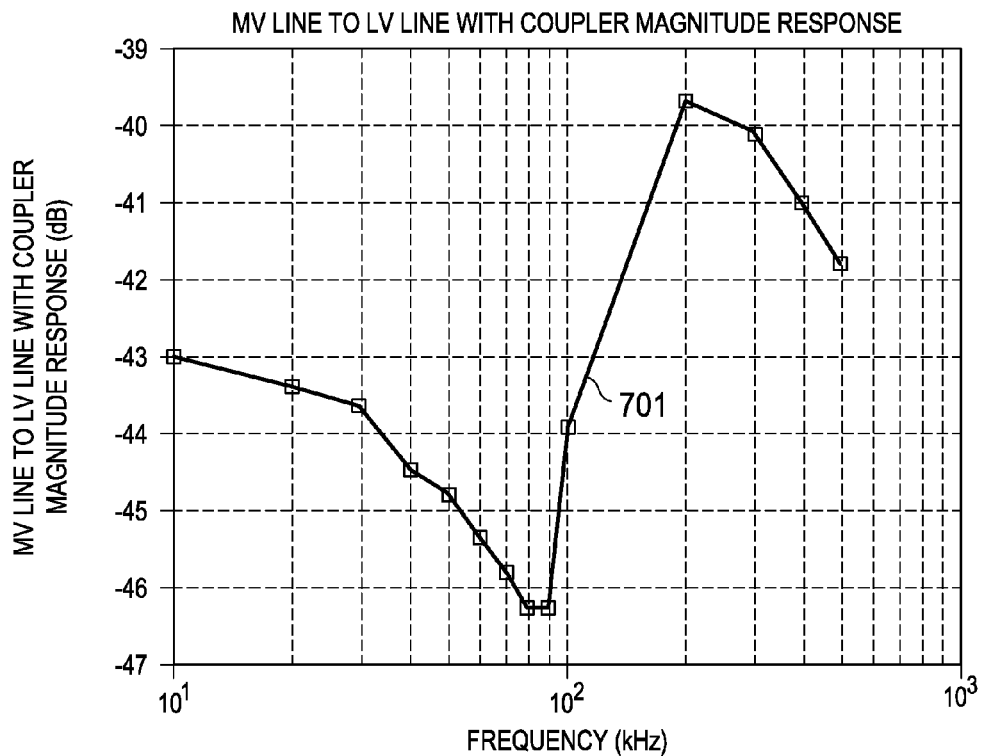
Figure 8:
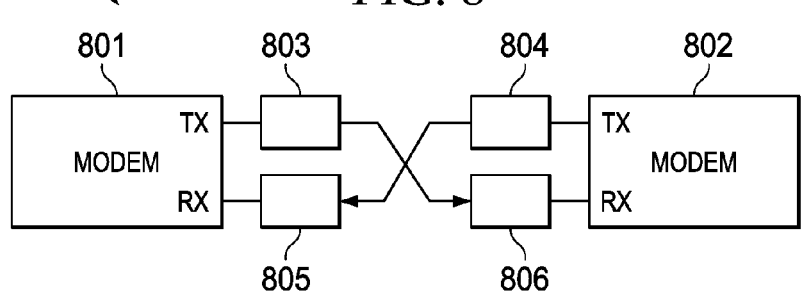
Figure 9:
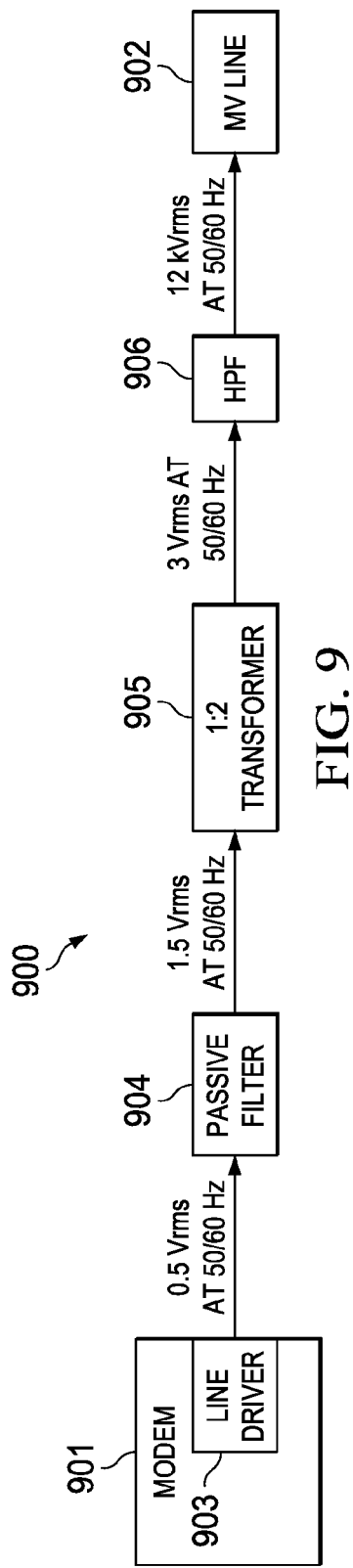
Figure 10:
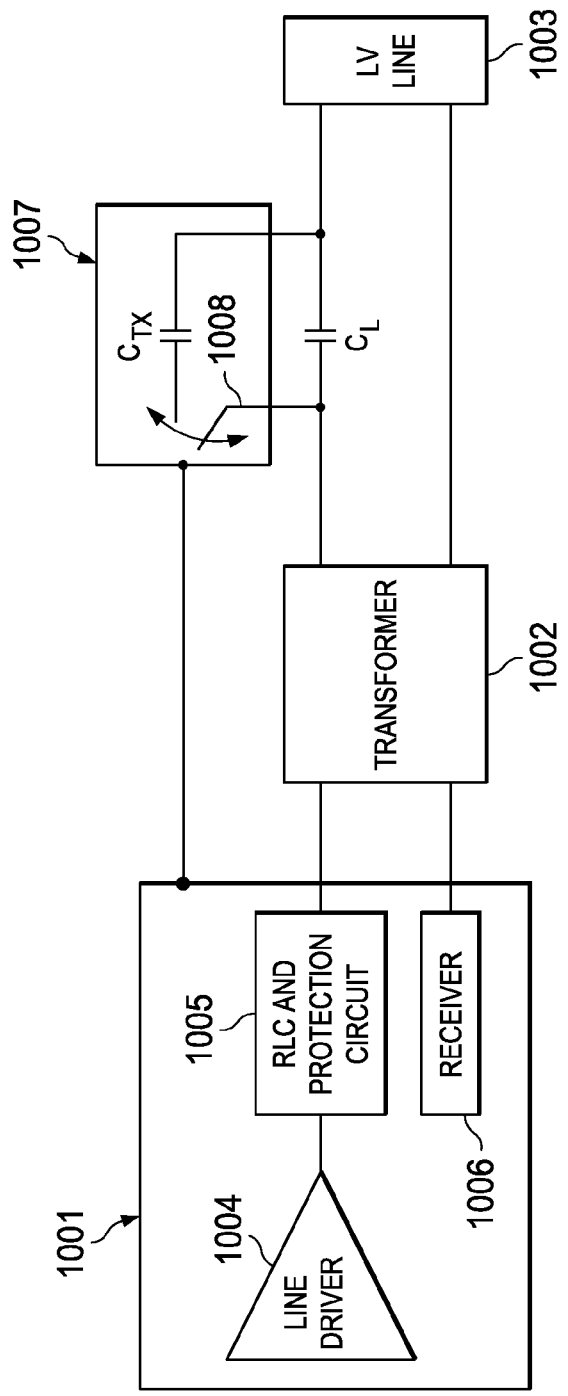

Having thus described the invention in general terms, reference will now be made to the accompanying drawings, wherein:

FIG. 1 illustrates a typical communication system for LV/MV communication;

FIG. 2 illustrates the frequency response for a typical commercial LV/MV distribution transformer;

FIG. 3 illustrates the frequency response of a typical MV coupler looking from the MV line side to an MV modem;

FIG. 4 illustrates the combined effect of the LV/MV distribution transformer and the MV coupler;

FIG. 5 illustrates the frequency response of a commercial LV/MV transformer from the MV side to the LV side;

FIG. 6 illustrates the frequency response of an MV coupler looking from the MV modem side line to MV line side;

FIG. 7 illustrates the combined effect of the LV/MV distribution transformer and the MV coupler;

FIG. 8 illustrates a communication circuit with modems having different transmit and receive interfaces;

FIG. 9 illustrates another embodiment of a coupling circuit for a modem is coupled to an MV transmission line; and FIG. 10 illustrates a coupling circuit for an LV modem.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The following disclosure first characterizes a commercial LV/MV distribution transformer and then discusses ways to improve how communications signals pass through the LV/MV distribution transformer either from LV to MV or from MV to LV.

LV/MV Communication Link Characterization

FIG. 1 illustrates a typical communication setup for LV/MV communication. LV modem 101 on the LV side of LV/MV distribution transformer 102 transmits and receives signals through LV/MV transformer 102. MV modem 103 correspondingly receives signals from LV modem 101 and transmits other signals to LV modem 101. The LV transmission lines have line impedance $R_{LV}$, and the MV transmission lines have line impedance $R_{MV}$. In this example network illustrated in FIG. 1, it is assumed that $R_{LV}$=2 ohm and $R_{MV}$=600 ohm. FIG. 1 also shows MV coupler 104, which connects MV modem 103 to the MV transmission line. To protect the MV modems from the higher voltage on the MV transmission line, the 50/60 Hz high voltage signals must be blocked from the MV modem 103 while allowing communication signals to pass to and from the MV modem 103. MV coupler 104 acts as a bandpass/highpass filter that rejects low frequency signals.

LV to MV Characterization

FIG. 2 illustrates the frequency response for a typical commercial LV/MV distribution transformer, such as an LV/MV distribution transformer available from Greenville Transformer Company, Greenville, Tex. The curves illustrate the frequency response for signals passing from the LV side to the MV side. In embodiment, an LV/MV transformer has a transformer turns ratio of 1:30. As a result, 240 V on the LV side becomes 7200 V on the MV side. The curves in FIG. 2 represent MV line impedances of infinite (i.e. open circuit) (201), 50 ohms (202) and 600 ohms (203). As shown in curves plotted in FIG. 2, the LV/MV distribution transformer acts as lowpass filter. For a line impedance of 600 ohm, the frequencies in the PRIME band (40-90 kHz) have approximately 10 to 15 dB attenuation.

FIG. 3 illustrates the frequency response of a typical MV coupler looking from the MV line side to an MV modem. The curves in FIG. 3 represent impedances on the modem side of the coupler that are infinite (i.e. open) (301) and 50 ohms (302). In the PRIME band, the attenuation is approximately 10 dB.

FIG. 4 illustrates the combined effect (401) of the LV/MV distribution transformer and the MV coupler. The result is approximately 25 dB attenuation in the PRIME band.

MV to LV Characterization

FIG. 5 illustrates the frequency response of a commercial LV/MV transformer from the MV side to the LV side. The LV/MV transformer turns ratio is 1:30. For the line impedance of LV side, the curves illustrate infinite (501), 50 ohm (502) and 2 ohm (503) impedances. The LV/MV distribution transformer acts as low pass filter. With a typical LV line impedance of 2 ohm, there is approximately 50-60 dB attenuation in the PRIME band.

FIG. 6 illustrates the frequency response of an MV coupler looking from the MV modem side line to MV line side. The curves in FIG. 6 represent impedances on the MV line side of infinite (601) and 400 ohms (602). In the PRIME band, MV coupler has a gain of approximately 10 dB.

FIG. 7 illustrates the combined effect (701) of the LV/MV distribution transformer and the MV coupler. The result is approximately 40-50 dB attenuation in the PRIME band.

As noted above, for a typical LV/MV distribution transformer and a typical MV coupler operating in the PRIME band, there is 45 dB attenuation from MV to LV and 25 dB attenuation from LV to MV line. In this case, the MV to LV link and the LV to MV link are not balanced. One way to improve the link quality between the LV modem 101 and MV modem 103 (FIG. 1) is to boost the signal level. The following section proposes several suggestions for link improvement in both directions.

MV to LV Link Improvement

In one embodiment, different isolation transformers may be used on the transmit and receive side at each modem. For example, on the MV to LV communication path there is approximately 45 dB attenuation. In one embodiment of a PRIME MV modem, a 1.5:1 isolation transformer ratio is used for both the transmit and receive sides of the MV modem. If 2 Vrms is injected into the MV coupler on the modem side, then the voltage level would be only 5 mVrms after the attenuation caused by the MV coupler and the LV/MV transformer on the LV line. If instead, a 1:1.5 isolation transformer ratio is used for the transmit side of the MV modem, then the injected signal to the line will be 4.5 Vrms before the MV coupler and the received signal voltage at the LV modem would be 12.5 mVrms after the 45 dB attenuation.

From a receiver sensitivity perspective, this voltage level (12.5 mVrms) provides enough signal strength to the modem for decoding. Note that decreasing the transmit ratio at the transmit path of the MV modem is enabled by two facts. First, conducted emission tests may not apply or may be looser for signals injected into the MV line through the coupler. Second, the impedance of the MV line is expected to be higher than the impedance of LV lines, which are typically more loaded than MV lines. Thus, even if the transformer ratio were reduced, the impedance seen by the line driver at the MV modem (which is directly proportional to the square of the transformer ratio) would still be large enough to not adversely affect signal quality.

A variation on the above approach is to use different coupling circuits for the transmit and receive side of the MV modem. In one embodiment, the transmitter path may use an isolation transformer with a smaller turns ratio than the receiver path. Both of the isolation transformers are connected to the MV coupler. An advantage of this technique is that the increased transmit signal level is obtained without reducing the receiver sensitivity.

FIG. 8 illustrates a communication circuit 800 in which modem 801 communicates with modem 802. Modems 801, 802 use transformers with different coupling ratios on the transmit and receive sides. Looking from the modems, isolation/coupling transformers 803, 804 on the transmit side have a turns ratio of 1.5:1, and isolation/coupling transformers 805, 806 on the receive side have a turns ratio of 1:1.5. As a result, the signals receive a boost at each transformer to counter the attenuation losses in the MV coupler and LV/MV transformer (not shown).

In another embodiment, the supply voltage can be increased to generate more voltage signal. For example, a current modem uses a 15 V signal. If instead a 24 V signal was used, then 4 dB more signal level would be provided at the transmitter. In this case, there is a 3.2 Vrms signal with a 1.5:1 transformer (7.2 Vrms with 1:1.5 transformer) and, after attenuation, there is a 20 mV signal with a 1.5:1 transformer at the transmitter (45 mV with 1:1.5 transformer).

In an alternative embodiment, a coupling circuit that has low impedance in the signal band can be used. This would reduce the loss caused by source impedance from a coupling circuit.

FIG. 9 illustrates another embodiment in which modem 901 is coupled to MV transmission line 902. The coupling circuit 900 of FIG. 9 is designed for sub-10 kHz signals on the MV side. Signals from modem 901 are transmitted through line driver 903. The signals then pass through passive filter 904, coupling transformer 905, and high pass filter (HPF) 906 before injection onto MV line 902. Transformer 905 may have a 1:2 turns ratio, for example. In one embodiment, HPF 906 is a two-pole filter with a corner at 6 kHz. In another embodiment, HPF 906 may be a single-pole filter; however, this may be difficult because of the large voltage seen on the line driver side and also due to the small line impedance seen on that side. Note that the MV side impedance can go as low as 10 Ohm.

Coupling circuit 900 allows signals from modem 901 to pass to MV line 902, while blocking the high-voltage 50/60 Hz signals on MV line 902 from reaching modem 901. As illustrated in the example shown in FIG. 9, the 12 kVrms signal at 50/60 Hz on theMV line is attenuated to 3 Vrms by HPF 906. Transformer 905 further attenuates the signal to 1.5 Vrms. Passive filter 904 reduces the signal to 0.5 Vrms at the modem line driver, which prevents damage to the line driver circuit 903 or to modem 901.

LV to MV Link Improvement

For signals sent from an LV modem (101) to an MV modem (103), the transmission can be improved, for example, by increasing the supply voltage to generate more signal at LV modem 101. For example, if a 15V signal is used with a line impedance of 2 ohm, then the generated signal voltage is 1 Vrms and, after 20 dB attenuation, the voltage will be 10 mVrms. If instead, a 24 V power supply is used, the generated signal voltage would be 1.6 Vrms and, after 20 dB attenuation, the signal voltage would will be 16 mVrms.

Because the line impedance at the LV side is small, it may not be possible to use the low turns ratio transformer at the transmitter. For example, if a 1:1.5 transformer is used and the line impedance is 2 ohm, then the signal level at the source side will be $2/(1.5)^2=0.89$ ohm. In this case, sufficient voltage may not be injected through the LV line.

However, using a different coupling circuit for the transmitter has other advantages. In many cases, there is a trade-off between the reactive power consumed by the coupling circuit and the amount of transmit signal loss in the coupling circuit for small load impedances. To avoid a high constant reactive power, a different coupling for the transmitter may be used, such as a transformer that is tuned to reduce signal loss at the expense of higher reactive power during transmission only. Such a technique applies to communication on both low voltage and medium lines, but it is expected to be more useful on the low voltage side because reactive power specifications are tighter in the LV lines.

FIG. 10 illustrates a coupling circuit for an LV modem. Modem 1001 is coupled to LV line 1003 via transformer 1002 and coupling capacitor $C_L$. On the transmit side, modem 1001 includes a line driver 1004 and coupling circuit 1005, which provides filtering and protection. On the receive side, modem 1001 includes receiver 1006. Modem 1001 is also coupled to switched capacitor circuit 1007. When modem 1001 is going to transmit, it commands switch 1008 to close, thereby coupling transmission capacitor $C_{TX}$ in parallel to the LV line. The value of coupling capacitor $C_L$ is directly proportional to the reactive power, but inversely proportional to the coupling circuit's in-band impedance and, hence, causes signal loss during transmission. By coupling the parallel capacitor $C_{TX}$ during transmission, the reactive power is increased. The receiver 1006 has a large look-in impedance, so even the smaller coupling circuit $C_L$ with a lower reactive power does not result in significant signal loss or reduction in sensitivity at the receiver. The parallel capacitor $C_{TX}$ is only switched into the circuit for transmission. It is expected that the transmission time would be less than the receive/listen time (i.e. low duty cycle) and that the LV line would be loaded infrequently.

In other embodiments, a different coupling circuit that has low impedance at the signal level may be used for the LV modem.

Alternatively, the coupling circuitry in FIG. 9 may be used on the MV side by connecting the receiver to the output of the passive filter 904.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. An interface for communication on a powerline communication network, comprising:
    a transmission transformer adapted to couple signals transmitted from a modem to a medium voltage line on the powerline communication network, the transmission transformer having a first turns ratio selected to amplify the signals transmitted from the modem, and wherein the second turns ratio for the receive transformer is selected to amplify the signals received from the powerline communication network; and
    a receiver transformer adapted to couple signals received from the medium voltage line on the powerline communication network to the modem, the receiver transformer having a second turns ratio that is greater than the first turns ratio.

2. An interface for communication on a powerline communication network, comprising:
    a transformer circuit coupling a modem to a powerline;
    a first coupling capacitor coupling the transformer circuit to the powerline;
    a second coupling capacitor coupled in parallel to the first coupling capacitor via a switch, the switch in an open position during reception by the modem, the switch in a closed position during transmission by the modem.

3. The interface of claim 2, wherein the value of the second capacitor is selected to increase a reactive power of the interface when the switch is closed.

4. The interface of claim 2, wherein the powerline is a low voltage powerline.

5. The interface of claim 2, wherein the powerline is a medium voltage powerline.

6. An interface for a powerline communication network, comprising:
    a line driver circuit providing data signals to be transmitted to the powerline communication network;
    a passive filter coupled to an output of the line driver circuit;
    a transformer coupled to an output of the passive filter; and
    a high pass filter coupled between an output of the transformer and a medium voltage powerline.

7. The interface of claim 6, wherein the high pass filter and passive filter attenuate signals at a power carrier frequency on the medium voltage powerline before reaching the line driver circuit.

8. The interface of claim 7, wherein the power carrier frequency is 50 Hertz or 60 Hertz.

9. The interface of claim 6, wherein the transformer has a turns ratio that amplifies transmitted data signals from the line driver circuit, and that attenuates received signals from the medium voltage powerline at a power carrier frequency.

* * * * *